United States Patent [19]
Schofield et al.

[11] Patent Number: 5,785,894
[45] Date of Patent: Jul. 28, 1998

[54] DISPERSANT FOR DISPERSING PARTICULATE SOLIDS

[75] Inventors: John David Schofield, Bury; Dean Thetford, Rochdale, both of United Kingdom

[73] Assignee: Zeneca Limited, London, Great Britain

[21] Appl. No.: 750,531

[22] PCT Filed: May 16, 1995

[86] PCT No.: PCT/GB95/01100

§ 371 Date: Dec. 13, 1996

§ 102(e) Date: Dec. 13, 1996

[87] PCT Pub. No.: WO95/34593

PCT Pub. Date: Dec. 21, 1995

[30] Foreign Application Priority Data

Jun. 13, 1994 [GB] United Kingdom ............... 9411791

[51] Int. Cl.⁶ ............... B01F 17/30; C07C 69/76
[52] U.S. Cl. ............... 252/356; 252/357; 558/108; 558/110; 558/114; 558/153; 558/156; 558/160
[58] Field of Search ............... 558/156.16, 108, 558/110, 114, 153; 252/356, 357

[56] References Cited

FOREIGN PATENT DOCUMENTS

| | | |
|---|---|---|
| 017 008 | 10/1980 | European Pat. Off. . |
| 164 535 | 12/1985 | European Pat. Off. . |
| 193 019 | 9/1986 | European Pat. Off. . |
| 35 42 441 | 6/1987 | Germany . |

OTHER PUBLICATIONS

Perret et al: "Synthese et caracterisation de copolymeres sequences polyoxyethlene/poly–epsilion–carprolactone", Die Makromolchemie, vol. 156, 1972,pp. 143–156–whole document–.

Ehara et al: "Phosphate polymers", Chemical Abstracts, vol. 81, No. 22, Dec. 2, 1974, abstract No. 1367Ow, p. 136756, see abstract & JP.A. 7 451 400 Sep. 14, 1972.

Martini et al:Micellisation and Gelation of Triblock Copolymer of Ethylene Oxide and epsilion–Caprolactone, $CL_n E_m$-$CL_n$, in Aqueous Solution, J.Chem.Soc.Faraday Trans., 1994, 90 (13) 1961–1966, see p. 1962,col 1.

*Primary Examiner*—John M. Cooney, Jr.
*Attorney, Agent, or Firm*—Pillsbury Madison & Sutro LLP

[57] ABSTRACT

A dispersant for aqueous mill-bases obtainable by reacting a polyethylene glycol with a molar excess of a hydroxycarboxylic acid containing from 4 to 17 carbon atoms or lactone thereof and/or with a $C_{3-4}$-alkylene oxide to form a polymeric diol and phosphating the diol. The preferred hydroxycarboxylic acid or lactone is ε-caprolactone.

17 Claims, No Drawings

DISPERSANT FOR DISPERSING PARTICULATE SOLIDS

This application is the national phase of international application PCT/ GB95/01100, filed May 16, 1995 which designated the U.S.

The present invention relates to a compound for dispersing particulate solids in an aqueous medium, its method of preparation and compositions containing said compound and a particulate solid, including paints.

Mill-bases for water-borne paints are conventionally prepared by subjecting an aqueous medium containing a water-insoluble particulate solid such as a pigment to a grinding operation in the presence of a dispersing agent in order to uniformly distribute the finely divided solid throughout the medium. However, when such mill-bases are added to a paint, the dispersing agent can adversely effect the film-forming characteristics of the paint and/or its durability as a paint film. Some dispersing agents also adversely affect the gloss of the resulting paint film. Consequently, improved dispersing agents are required which are capable of dispersing greater amounts of particulate solid in the medium, and exhibiting increased stability of the dispersion and superior properties in the resulting paint film, especially higher gloss finish.

EP 555,950 discloses aqueous mill bases containing a pigment and dispersant which is a polycyclic compound having a poly ($C_{2-4}$-alkyleneoxy) chain containing from 3 to 50 alkyleneoxy groups. Although the dispersant of the present invention also contains a polyalkylene chain it does not contain a terminal polycyclic group such as a naphthalene ring and the present dispersants have been found to provide a paint film with a much superior gloss.

According to the present invention there is provided a dispersant obtainable by reacting a polyethylene glycol (hereinafter "PEG") with a molar excess of a hydroxycarboxylic acid containing from 4 to 17 carbon atoms or lactone thereof (hereinafter "HCA") and/or with a $C_{3-4}$-alkylene oxide (hereinafter "AO") to form a polymeric diol and phosphating the diol by reaction with a phosphating agent to give a phosphate ester. The dispersant may be in the free acid form or it may form a salt with an alkali metal, ammonia, an amine, alkanolamine or quaternary ammonium cation. The phosphate ester group may also be further partially esterified by reaction with an alcohol or may form a salt with an alkanolamine. Thus, in one aspect of the invention the dispersant is derived from a polymeric diol obtainable by reacting a PEG with a molar excess of a HCA.

It is to be understood that the PEG includes block copolymers of ethylene oxide (EO) and propylene oxide (PO) wherein the latter constitutes a middle portion attached at each end to EO units and wherein the amount of PO is less than 50%, preferably less than 30% and more preferably less than 10% by weight relative to the total weight of PEG. It is especially preferred that the PEG consists essentially of EO units.

In another aspect of the invention the dispersant is derived from a polymeric diol obtainable by reacting a PEG with a molar excess of a AO.

In a still further aspect of the invention the dispersant is derived from a polymeric diol obtainable by reacting a PEG with a molar excess of a HCA and a AO wherein the reaction of the PEG with the HCA and the AO is carried out either simultaneously or sequentially.

In all three aspects, the polymeric diol is a block copolymer having terminal hydroxyl groups.

In a preferred aspect of the invention the dispersant is obtainable from a polymeric diol of general formula (1):

wherein:

A is the group

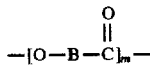

or the group $—[O—D—]_m$;

B is $C_{4-17}$-alkylene;

D is $C_{3-4}$-alkylene;

m is from 2 to 50; and n is from 4 to 500.

Preferably, the repeat unit

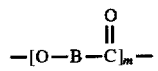

is derivable from 6-hydroxyhexanoic acid, ricinoleic acid, 12-hydroxystearic acid, 12-hydroxydodecanoic acid, 5-hydroxydodecanoic acid, 5-hydroxydecanoic acid, 4-hydroxydecanoic acid and ε-caprolactone including mixtures thereof. It is especially preferred that B is $—(CH_2)_5—$ and that the repeat unit is derived from ε-caprolactone.

Preferably, m is at least 3, more preferably at least 4 and especially at least 6. It is preferred that m is less than 40, more preferably less than 30 and especially less than 20.

Preferably, n is at least 6, more preferably at least 8 and especially at least 10. It is also preferred that n is less than 400, preferably less than 300, more preferably less than 200 and especially less than 100.

The ratio of the molecular weight of —A— and molecular weight of the group $[—CH_2—CH_2—O]_n—$ is preferably between 2.5:1 and 1:5 and especially between 1.5:1 and 1:3.

The polymeric diol is preferably converted to the phosphate ester by reacting the diol with polyphosphoric acid, $P_2O_5$ or $POCl_3$. Preferably, the ratio of the hydroxy groups of the diol to the phosphorus atom of the phosphating agent is from 3:1 to 1:1 and especially from 2:1 to 1:1.

The reaction between the phosphating agent and the polymeric diol may optionally be carried out in the presence of an alcohol or alkanolamine or the phosphate ester of the polymer diol may be subsequently reacted with an alcohol or an alkanolamine. When the reaction involves an alcohol the phosphate end group(s) are partially further esterified. When the reaction involves an alkanolamine additional ester and/or amide groups and/or amine salts with the phosphated polymeric diol are formed. It is believed that the reaction product is mainly an amine salt.

The alcohol or alkanolamine preferably has a molecular weight below 250 and especially below 100. Examples of suitable alkanolamines are ethanolamine, diethanolamine, 2-dimethylaminoethanol and 2-amino-2-methyl-1-propanol.

The preferred dispersants are those derived from PEG having a molecular weight from 500 to 6000. It is also preferred that the HCA is derived from ε-caprolactone. Preferably, the PEG is end-capped at each end with poly(5-hydroxy hexanoic acid) (PHHA) such that the ratio of the MW's of PHHA to PEG is from 1 to 10, more preferably from 1 to 5 and especially from 1 to 1.

The polymeric diol can be made by reacting the PEG with the HCA at elevated temperatures optionally in the presence of an inert solvent. Preferably the two components are reacted together in the absence of a solvent, especially in the presence of a catalyst and more especially in an inert atmosphere such as nitrogen. Preferably the two components are reacted together at a temperature above 100° C., more preferably above 140° C. and especially above 160° C. Preferably the temperature is below 250° C., more preferably below 200° C. and especially below 180° C.

Preferred catalysts are alkyl titanates, especially tetraalkyl titanates such as tetrabutyltitanate.

When the PEG is reacted with a AO to form the polymeric diol similar reaction conditions may be used except that the catalyst is normally an alkali metal hydroxide such as potassium hydroxide and the reaction vessel is preferably pressurised to prevent loss of the volatile AO. Consequently, the reaction between the PEG and AO is preferably carried out a temperature below 100° C. and in an inert atmosphere such as nitrogen.

As noted hereinbefore the dispersants according to the present invention are suitable for uniformly distributing a particulate solid in a liquid medium, especially an aqueous medium.

Thus, according to a further aspect of the invention there is provided a composition comprising a dispersant as hereinbefore defined and a particulate solid.

Preferably, the composition further comprises a liquid, especially one in which the dispersant is at least partially soluble and more especially is either water or an organic liquid which is miscible with water including mixtures thereof. Examples of suitable liquids include alcohols such as $C_{1-10}$-aliphatic alcohols; glycols such as $C_{2-6}$-alkylene glycols; alcohol ethers such as methoxy-, ethoxy-, propoxy- and butoxyethanol and methoxy-, ethoxy- and propoxypropanol; and glycol ethers such as diethylene glycol and propylene glycol. Generally, the liquid is selected to meet the requirements of the end-use to which the composition is put, especially compatibility with any medium with which it is to be diluted. Preferably, the liquid comprises at least 25% more preferably at least 50% and especially at least 75% by weight water relative to the total weight of the composition.

The composition may comprise an intimate mixture of the dispersant and the particulate solid but preferably comprises a coating of the dispersant on a finely divided particulate solid. Preferably the particulate solid has a mean diameter of less than 15μ, more preferably less than 10μ, especially less than 5μ and most especially less than 3μ.

The particulate solid can be any material which it is desired to stabilise in a finely divided state in a liquid medium. Examples of suitable solids are pigments and fillers for inks, paints and other surface coatings; magnetic metals or alloys and magnetic oxides, for use in the production of magnetic tapes, discs and memory devices; dirt and soil particles; biocides, agrochemicals and pharmaceuticals. The composition, whether dry or in the form of a dispersion, may contain other ingredients such as resins, binders, fluidising agents, anti-sedimentation agents, plasticisers, humectants, coalescents, co-solvents, thickeners and preservatives. These ingredients may be soluble in, partially soluble in, insoluble in, or dispersed in the liquid medium.

If the solid is a pigment, it is preferably an inorganic pigment, a metallic pigment, or a metal salt of an organic dyestuff (sometimes referred to as a lake or toner). It may come from any of the recognised classes of pigments described, for example, in the Third Edition of the Colours Index (1971) and subsequent revisions and supplements thereto, under the chapter headed "Pigments".

Examples of inorganic pigments are titanium dioxide (including Anatase and Rutile forms, and high UV absorbing ultra-fine titanium dioxide), zinc oxide, Prussian Blue, cadmium sulphide, iron oxides (including transparent iron oxides), ultramarine, mica (including pearlescent pigments made by surface treating mica with, for example fine titanium dioxide) and the chrome pigments, including chromates, molybdates, and mixed chromates and sulphates of lead, zinc, barium, calcium and mixtures and modifications thereof which are commercially available as greenish-yellow to red pigments under the names of primrose, lemon, middle, orange, scarlet and red chromes.

Examples of metallic pigments are aluminium flake, copper powder and copper flake.

Examples of metal salts of organic dyestuffs are the azo metal salt pigments such as CI Pigment red 48 (also known as 2B Toner or Permanent Red 2B), CI Pigment Red 53 (also known as Lake Red C or Red Lake C), CI Pigment Red 52, CI Pigment Red 57 (also known as 4B Toner, Lithol Rubine, Rubine Toner or Permanent Red 4B), CI Pigment Red 58, CI Pigment Red 247, CI Pigment Yellow 61, CI Pigment Yellow 62, CI Pigment Yellow 183 and CI Pigment Yellow 191.

Examples of fillers are calcium carbonate, hydrated alumina, talc, quartz, silica (precipitated, pyrogenic and synthetic), metal silicates, barium and calcium sulphate, china clay, antimony oxide, powdered slate, wollastonite and chopped glass fibre.

The composition may be made by any method known to the art. Thus, it may be prepared by mixing together the dispersant and particulate solid and preferably then grinding the composition to obtain the desired particle size of the solid. Preferably, however, the dispersant may be added to the particulate solid in the presence of a liquid during the final preparation or finishing stages of the particulate solid. Generally, the composition is, however, prepared by mixing the dispersant, particulate solid and a liquid medium and then grinding or milling the composition to obtain the desired particle size of the particulate solid. The liquid medium may be water or an organic liquid in which the dispersant is preferably at least partially soluble. If the composition is required in dry form, the liquid medium is preferably volatile so that it may be readily removed from the particulate solid by simple separation means such as evaporation. It is preferred however that the composition comprises the liquid medium.

If the dry composition consists essentially of the dispersant and the particulate solid, it preferably contains at least 0.2%, more preferably at least 0.5% and especially at least 1% by weight of dispersant based on the weight of the particulate solid. Preferably, the dry composition contains not greater than 100%, preferably not greater than 50%, more preferably not greater than 20% and especially not greater than 10% by weight dispersant based on the weight of the particulate solid.

When the composition comprises a dispersant, particulate solid and a liquid medium, it preferably contains at least 5%, more preferably at least 20%, especially at least 40% and most especially at least 50% particulate solid based on the total weight of the composition. Preferably, the composition contains not greater than 90%, more preferably not greater than 80% and especially not greater than 75% by weight solid based on the total weight of the composition. The preferred amount of dispersant relative to the particulate solid is as defined hereinbefore for the dry composition.

Some of the polymeric diols are new. Hence, as a further aspect of the invention there is provided a polymeric diol of formula 1

wherein:

A is the group

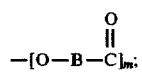

B is $C_{4-17}$-alkylene;

m is from 2 to 50; and n is from 4 to 500.

The invention is further illustrated by the following examples in which all parts and percentages are by weight unless otherwise indicated.

Intermediate diols for making Dispersants

Intermediate 1

A mixture of polyethylene glycol (average molecular weight 1500, 45.00 parts), ε-caprolactone (61.56 parts) and tetrabutyl titanate (0.21 parts) was stirred under nitrogen for 5 hours at 160°–180° C. The reaction mass was then discharged and allowed to solidify to a waxy solid.

Intermediate 2

A mixture of PEG 1500 (33.60 parts), ε-caprolactone (66.40 parts) and tetrabutyl titanate (0.20 parts) was stirred under nitrogen for 5 hours at 160°–180° C. The reaction mass was then discharged and allowed to solidify to a waxy solid.

Intermediate 3

A mixture of PEG 1000 (32.77 parts), ε-caprolactone (67.23 parts) and tetrabutyl titanate (0.20 parts) was stirred under nitrogen for 5 hours at 160°–180° C. The reaction mass was then discharged and allowed to solidify to a waxy solid.

Intermediate 4

A mixture of PEG 600 (39.68 parts), ε-caprolactone (60.32 parts) and tetrabutyl titanate (0.20 parts) was stirred under nitrogen for 5 hours at 160°–180° C. The reaction mass was then discharged and allowed to solidify to a waxy solid.

Intermediate 5

A mixture of PEG 200 (20.00 parts), ε-caprolactone (45.60 parts) and tetrabutyl titanate (0.10 parts) was stirred under nitrogen for 5 hours at 160°–180° C. The reaction mass was then discharged and allowed to solidify to a waxy solid.

Intermediate 6

A mixture of PEG 300 (30.00 parts), ε-caprolactone (45.60 parts) and tetrabutyl titanate (0.15 parts) was stirred under nitrogen for 5 hours at 160°–180° C. The reaction mass was then discharged and allowed to solidify to a waxy solid.

Intermediate 7

A mixture of PEG 400 (30.00 parts), ε-caprolactone (51.30 parts) and tetrabutyl titanate (0.16 parts) was stirred under nitrogen for 5 hours at 160°–180° C. The reaction mass was then discharged and allowed to solidify to a waxy solid.

Intermediate 8

A mixture of PEG 1500 (2.43 parts), 12-hydroxydodecanoic acid (3.50 parts) and tetrabutyl titanate (0.04 parts) was stirred under nitrogen for 5 hours at 160°–180° C. The reaction mass was then discharged and allowed to solidify to a waxy solid.

Intermediates 9 to 39

Intermediates 9 to 37 were all preferred by the method described for Intermediate 1 except that the amounts of PEG, ε-caprolactone and tetrabutyl titanate (TBT) were varied as detailed in Table 1 below. In the case of intermediates 38 and 39, the PEG was also replaced by Synperonic PE L35 (an ethylene oxide/propylene oxide/ethylene oxide block co-polymer) and Pluronic 17R4 (a propylene oxide/ethylene oxide/propylene oxide block co-polymer), respectively. Synperonic is a registered trade mark of ICI PLC and Pluronic is a registered trade mark of BASF.

Intermediate 9 was obtained as a liquid. Intermediates 38 and 39 were obtained as pastes and the remainder were obtained as waxy solids.

TABLE 1

| Intermediate | Diol | Amount of Diol | Amount of ε-caprolactone | Amount of TBT |
|---|---|---|---|---|
| 9 | PEG 200 | 20 | 22.8 | 0.1 |
| 10 | PEG 600 | 70 | 26.6 | 0.5 |
| 11 | PEG 600 | 30 | 91.2 | 0.5 |
| 12 | PEG 1000 | 80 | 18.2 | 0.5 |
| 13 | PEG 1000 | 50 | 57 | 0.5 |
| 14 | PEG 1000 | 50 | 148.3 | 0.45 |
| 15 | PEG 1500 | 80 | 12.2 | 0.5 |
| 16 | PEG 1500 | 80 | 24.3 | 0.5 |
| 17 | PEG 1500 | 100 | 76.1 | 1.05 |
| 18 | PEG 1500 | 30 | 82.15 | 0.5 |
| 19 | PEG 1500 | 25 | 95 | 0.5 |
| 20 | PEG 2000 | 80 | 18.2 | 0.5 |
| 21 | PEG 2000 | 100 | 76.1 | 1.05 |
| 22 | PEG 2000 | 50 | 51.3 | 0.4 |
| 23 | PEG 2000 | 50 | 74.1 | 0.45 |
| 24 | PEG 2000 | 50 | 102.6 | 0.45 |
| 25 | PEG 2000 | 15 | 85.6 | 0.5 |
| 26 | PEG 3000 | 50 | 34.2 | 0.45 |
| 27 | PEG 3000 | 50 | 49.45 | 0.45 |
| 28 | PEG 3000 | 50 | 68.4 | 0.5 |
| 29 | PEG 3000 | 50 | 102.6 | 0.5 |
| 30 | PEG 3000 | 25 | 83.6 | 0.5 |
| 31 | PEG 3000 | 10 | 66.2 | 0.5 |
| 32 | PEG 3400 | 50 | 73.85 | 0.5 |
| 33 | PEG 4000 | 50 | 76.95 | 0.5 |
| 34 | PEG 6000 | 80 | 27.4 | 0.5 |
| 35 | PEG 6000 | 50 | 85.5 | 0.5 |
| 36 | PEG 8000 | 80 | 20.5 | 0.6 |
| 37 | PEG 8000 | 50 | 77 | 0.5 |
| 38 | Synperonic PE L35 | 51.2 | 30.8 | 0.2 |
| 39 | Pluronic 17R4 | 50 | 21.1 | 0.2 |

EXAMPLES

Example 1

Intermediate 1 (30.0 parts) was heated to 60° C., phosphorus pentoxide (0.80 parts) added and the mixture stirred under nitrogen for 1 hour at 60° C. The temperature was raised to 85°–90° C. and held for a further 23 hours. The reaction mass was then discharged and allowed to solidify to a waxy solid. This product is hereinafter referred to as Dispersant 1.

Examples 2

Intermediate 2 (30.0 parts) was heated to 60° C., phosphorus pentoxide (0.64 parts) added and the mixture stirred under nitrogen for 1 hour at 60° C. The temperature was raised to 80°–90° C. and held for a further 23 hours. The reaction mass was then discharged and allowed to solidify to a waxy solid. This product is hereinafter referred to as Dispersant 2.

Example 3

Intermediate 3 (30.0 parts) was heated to 60° C., phosphorus pentoxide (0.93 parts) added and the mixture stirred under nitrogen for 1 hour at 60° C. The temperature was raised to 80°–90° C. and held for a further 23 hours. The reaction mass was then discharged and allowed to solidify to a waxy solid. This product is hereinafter referred to as Dispersant 3.

Example 4

Intermediate 4 (30.0 parts) was heated to 60° C., phosphorus pentoxide (1.88 parts) added and the mixture stirred under nitrogen for 1 hour at 60° C. The temperature was raised to 80°–90° C. and held for a further 23 hours. The reaction mass was then discharged and allowed to solidify to a waxy solid. This product is hereinafter referred to as Dispersant 4.

Example 5

Intermediate 5 (30.0 parts) was heated to 30° C., phosphorus pentoxide (4.33 parts) added and the mixture stirred under nitrogen for 1 hour at 30° C. The temperature was raised to 60° C. and held for 3 hours and then raised to 90°–100° C. for a further 20 hours. The reaction mass was then discharged and allowed to solidify to a waxy solid. This product is hereinafter referred to as Dispersant 5.

Example 6

Intermediate 6 (30.0 parts) was heated to 30° C., phosphorus pentoxide (3.76 parts) added and the mixture stirred under nitrogen for 1 hour at 30° C. The temperature was raised to 60° C. and held for 3 hours and then raised to 90°–100° C. for a further 20 hours. The reaction mass was then discharged and allowed to solidify to a waxy solid. This product is hereinafter referred to as Dispersant 6.

Example 7

Intermediate 7 (30.0 parts) was heated to 30° C., phosphorus pentoxide (2.62 parts) added and the mixture stirred under nitrogen for 30 minutes at 30° C. The temperature was raised to 60° C. and held for 3½ hours and then raised to 90°–100° C. for a further 20 hours. The reaction mass was then discharged and allowed to solidify to a waxy solid. This product is hereinafter referred to as Dispersant 7.

Example 8

Intermediate 8 (5.93 parts) was heated to 60° C., phosphorus pentoxide (0.153 parts) added and the mixture stirred under nitrogen for 1 hour at 60° C. The temperature was raised to 90°–100° C. and held for a further 23 hours. The reaction mass was then discharged and allowed to solidify to a waxy solid. This product is hereinafter referred to as Dispersant 8.

Example 9

Dispersant 1 (50.0 parts, Acid Value 27.36 mgs KOH/g) was heated until molten (60°–70° C.) and 2-amino-2-methyl-1-propanol (2.065 parts) added with stirring. The temperature was raised to 90°–100° C. and the mixture held with stirring for 1 hour. The reaction mass was then discharged and allowed to cool to a waxy solid. The product is hereinafter referred to as Dispersant 9.

Example 10

This was prepared in a similar manner to Dispersant Salt 1 but using Dispersant 1 (50.0 parts) and diethanolamine (2.43 parts). The product is hereinafter referred to as Dispersant 10.

Example 11

This was prepared in a similar manner to Dispersant Salt 1 but using Dispersant 1 (50.0 parts) and monoethanolamine (1.42 parts). The product is hereinafter referred to as Dispersant 11.

Example 12

This was prepared in a similar manner to Dispersant Salt 1 but using Dispersant 1 (50.0 parts) and 2-dimethylaminoethanol (2.065 parts). The product is hereinafter referred to as Dispersant 12.

Examples 13 to 51 and Comparative Examples A, B and C

These examples were all prepared in analogous manner to that described for example 1 except that the Intermediate 1 and amount was replaced by the diol listed in Table 2 below and the amount of phosphorus pentoxide (PO) was varied as indicated in the table or replaced by polyphosphoric acid (PPA) as indicated. The physical form of the dispersant obtained in also indicated in Table 2.

The dispersants obtained from these examples all bear the example legend hereinafter. Thus, Dispersant 13 is the product from example 13 and Comparative Dispersant A is the product from Comparative Example A.

TABLE 2

| Ex | Diol | Amount of Diol | Amount of PO | Amount of PPA | Appearance |
|---|---|---|---|---|---|
| 13 | Intermediate 9 | 30 | 6.63 | — | paste |
| 14 | Intermediate 10 | 94 | 11 | — | oil |
| 15 | Intermediate 11 | 121 | 2.4 | — | wax |
| 16 | Intermediate 12 | 95 | 7.6 | — | wax |
| 17 | Intermediate 13 | 104 | 4.73 | — | wax |
| 18 | Intermediate 14 | 198 | 4.74 | — | wax |
| 19 | Intermediate 15 | 90 | 5.05 | — | wax |
| 20 | Intermediate 16 | 100 | 5.05 | — | wax |
| 21 | Intermediate 17 | 177 | 7.43 | — | wax |
| 22 | Intermediate 18 | 112 | 1.9 | — | wax |
| 23 | Intermediate 19 | 116 | 1.57 | — | wax |
| 24 | Intermediate 20 | 96 | 3.79 | — | wax |
| 25 | Intermediate 21 | 158 | 5.57 | — | wax |
| 26 | Intermediate 22 | 101 | 2.37 | — | wax |
| 27 | Intermediate 23 | 120 | 2.37 | — | wax |
| 28 | Intermediate 24 | 150 | 2.37 | — | wax |
| 29 | Intermediate 25 | 95 | 0.71 | — | wax |
| 30 | Intermediate 26 | 80 | 1.58 | — | wax |
| 31 | Intermediate 27 | 95 | 1.58 | — | wax |
| 32 | Intermediate 28 | 115 | 1.58 | — | wax |
| 33 | Intermediate 29 | 150 | 1.58 | — | wax |
| 34 | Intermediate 30 | 109 | 0.79 | — | wax |
| 35 | Intermediate 31 | 73 | 0.32 | — | wax |
| 36 | Intermediate 32 | 121 | 1.39 | — | wax |
| 37 | Intermediate 33 | 125 | 1.18 | — | wax |
| 38 | intermediate 34 | 101 | 1.26 | — | wax |
| 39 | Intermediate 35 | 130 | 1.25 | — | wax |
| 40 | Intermediate 36 | 95 | 0.95 | — | wax |
| 41 | Intermediate 37 | 124 | 0.59 | — | wax |
| A | PEG 1500 | 100 | 6.3 | — | wax |
| B | PEG 2000 | 100 | 4.73 | — | wax |
| C | Synperonic PE L64 | 100 | — | 3.84 | oil |
| 42 | Intermediate 38 | 81 | — | 3 | paste |
| 43 | Pluronic 10R5 | 100 | — | 5.66 | oil |

TABLE 2-continued

| Ex | Diol | Amount of Diol | Amount of PO | Amount of PPA | Appearance |
|---|---|---|---|---|---|
| 44 | Pluronic 17R4 | 100 | — | 4.12 | oil |
| 45 | Pluronic 25R4 | 100 | — | 2.93 | oil |
| 46 | Intemediate 39 | 71 | — | 2.06 | paste |
| 47 | Pluronic 10R8 | 100 | — | 2.23 | wax |
| 48 | Pluronic 17R8 | 100 | — | 1.31 | wax |
| 49 | Pluronic 25R5 | 100 | — | 2.23 | wax |
| 50 | Pluronic 25R8 | 100 | — | 0.89 | wax |
| 51 | Pluronic 31R4 | 100 | — | 2.16 | wax |

Examples 52–59

The following examples having the formulations described in Table 3 below were prepared by ball milling the ingredients on a laboratory shaker with 3 mm glass beads for 17 hours. In each case the total weight was made up to 10 g with water. All were fluid dispersions.

TABLE 3

| Example | Amount Rutile TiO$_2$ | Dispersant & Amount | Resin (a) | Antifoam |
|---|---|---|---|---|
| 52 | 6.5 g | Disp. 1 0.33 g | 0.73 g | 0.05 g |
| 53 | 6.5 g | Disp. 2 0.33 g | 0.73 g | 0.05 g |
| 54 | 6.5 g | Disp. 3 0.33 g | 0.73 g | 0.05 g |
| 55 | 6.5 g | Disp. 4 0.33 g | 0.73 g | 0.05 g |
| 56 | 7.0 g | Disp. 6 0.14 g | — | — |
| 57 | 7.0 g | Disp. 7 0.14 g | — | — |
| 58 | 7.0 g | Disp. 1 0.42 g | — | 0.05 g |
| 59 | 7.0 g | Disp. 8 0.14 g | — | 0.05 g |

(a) Footnote to Table 3
The resin used was a 45% solids wholly acrylic emulsion polymer of pH 9 ± 0.5 supplied by ICI Resins, Waalwijk, Holland under the trade name NEOCRYL XK90. The antifoam was supplied by Henkel-Nopco under the trade name DEHYDRAN 1293.

Examples 60 to 62

Details of the millbase and letdown formulations for the water based paint system employed in Examples 60–62 are given in Table 4.

The millbases were prepared by ball milling the ingredients in a high energy ball mill with 3 mm glass beads for 30 minutes. After milling the millbase was converted into a usable paint by the addition of the letdown emulsion.

TABLE 4

| Millbases | Example 60 | Example 61 | Example 62 |
|---|---|---|---|
| Dispersant 1 | 2.8 | | |
| Dispersant 2 | | 2.8 | |
| Dispersant 3 | | | 2.8 |
| Water | 13.87 | 13.87 | 13.87 |
| NEOCRYL XK90 | 4.51 | 4.51 | 4.51 |
| DEHYDRAN 1293 | 0.32 | 0.32 | 0.32 |
| TIOXIDE TR92 | 39.94 | 39.94 | 39.94 |

TABLE 4-continued

| Millbases | Example 60 | Example 61 | Example 62 |
|---|---|---|---|
| Letdown | | | |
| NEOCRYL XK90 | 94.51 | 94.51 | 94.51 |
| Propylene Glycol | 3.80 | 3.80 | 3.80 |

Footnote to Table 4
Aqueous solutions of Dispersants 1 to 3 are acidic so their pH was raised to 9 ± 1 with ammonia solution prior to the addition of the resin.

Test panels were prepared by coating aluminium and primed steel panels using a mechanised wire wound K bar draw down system supplied by RK Print-Coat Instruments Ltd.,Royston, Herts., England. The K bar was calibrated to leave a wet film thickness of 100 microns. The paint films were allowed to dry at ambient temperature for 90 minutes and then baked at 120° C. for 30 minutes. The average gloss of each panel was calculated from the mean of 5 readings taken over the panel surface. These results are given in Table 5.

TABLE 5

| | Average 20° Gloss | |
|---|---|---|
| Example | Aluminium Panel | Primed Panel |
| 60 | 56.06 | 51.02 |
| 61 | 60.02 | 58.60 |
| 62 | 52.52 | 53.38 |

The moisture resistance of each paint was tested by immersing the aluminium panel in water at 80° C. for 24 hours. In all cases none of the paints showed signs of blistering, shrinkage, or loss of adhesion.

Examples 63 to 65

The paint formulation employed in these examples were prepared by the method described in examples 52 to 59 which were then coated, dried and tested in an identical manner to those set out in Examples 60 to 62. The only difference is the omission of resin from the millbase. Details of the formulations are given in Table 6 in which all quantities are in grammes. The results of the gloss measurements are given in Table 7.

TABLE 6

| Millbases | Example 63 | Example 64 | Example 65 |
|---|---|---|---|
| Dispersant 1 | 1.29 | | |
| Dispersant 7 | | 1.29 | |
| Dispersant 8 | | | 0.86 |
| Water | 7.76 | 7.76 | 8.19 |
| DEHYDRAN 1293 | 0.16 | 0.16 | 0.16 |
| TIOXIDE TR92 | 21.50 | 21.50 | 21.50 |
| Letdown | | | |
| NEOCRYL XK90 | 53.10 | 53.10 | 53.10 |
| Propylene Glycol | 2.20 | 2.20 | 2.20 |

Footnote to Table 6
Aqueous solutions of Dispersants 1, 7 & 8 are acidic so their pH was raised to 9 ± 1 with ammonia solution prior to the addition of the other ingredients.

TABLE 7

| | Average 20° Gloss | |
|---|---|---|
| Example | Aluminium Panel | Primed Panel |
| 63 | 58.86 | 52.36 |
| 64 | 45.52 | 41.44 |
| 65 | 53.58 | 49.92 |

None of the paints applied to the aluminium panels showed signs of blistering, shrinkage or loss of adhesion on immersion in water at 80° C. for 24 hours.

Examples 66 to 102 and Comparative Examples D, E, F and G

Mill bases were prepared by adding the dispersants (4.8 parts) listed in Table 8 below to water (37.6 parts) and 2-amino-2-methylpropanol (0.6 parts) and adjusting the pH to between 10 and 10.2 with 2-amino-2methylpropanol. The water dispersant mix was warmed on a steam bath to fully dissolve the dispersant. The aqueous solution of the dispersant was then cooled, poured into a dispermat pot and titanium dioxide (Tioxide TR92, 79.84 parts) added with stirring followed by 1 mm diameter glass beads (180 parts) again with stirring. The mill bases were then milled at a speed of 3000 rmp on a Dispermat F1 disperser (VMA Getzmann, West Germany) for 30 minutes with no water running through the cooling jacket. The temperature during milling rose to between 30° and 40° C. The mill bases were then allowed to cool and the paints filtered from the glass beads. These paints were then let down to final volume by adding Neocryl XK90 resin and propylene glycol in the amounts given by the formulae $$\text{Weight of Neocryl resin} = Y \times \frac{212.4}{122.84}$$

$$\text{Weight of propylene glycol} = Y \times \frac{8.8}{122.84}$$

where Y is the yield of millbase.

The let-down paints were allowed to stand overnight (16 hours) to de-aerate and were then coated onto primed and bare aluminium panels using a No 8 K-bar on an automatic coater (KCC 202, Zeneca Ltd) to give a wet film thickness of 100 μm. The film was air-dried for 90 minutes and then cured in an oven by baking at 120° C. for 30 minutes. The 20° gloss of the dried paint film was finally measured using a Novo-gloss Meter (Rhopoint Instrumentation, UK).

A mill base using β-naphthol 10E0 was prepared in identical manner except that no 2-amino-2-methylpropanol was used and the amount of water was increased from 37.6 to 38.2 parts.

The results are given in Table 8 below.

TABLE 8

| | | Average 20° Gloss | |
|---|---|---|---|
| Example | Dispersant | Aluminium Panel | Primed Panel |
| 66 | 4 | 43.8 | 47.9 |
| 67 | 5 | 33.2 | 24.2 |
| 68 | 6 | 22.6 | 23.5 |
| 69 | 13 | 38.9 | 35.9 |
| 70 | 14 | 43.4 | 33.0 |
| 71 | 15 | 49.9 | 40.7 |
| 72 | 16 | 50.8 | 45.0 |
| 73 | 17 | 57.6 | 48.9 |
| 74 | 18 | 30.2 | 30.9 |
| 75 | 19 | 46.8 | 41.0 |
| 76 | 20 | 56.4 | 49.0 |
| 77 | 21 | 49.6 | 27.8 |
| 78 | 22 | 48.4 | 43.9 |
| 79 | 23 | 24.4 | 23.7 |
| 80 | 24 | 50.8 | 45.4 |
| 81 | 25 | 37.9 | 29.0 |
| 82 | 26 | 59.3 | 53.0 |
| 83 | 27 | 56.5 | 51.2 |
| 84 | 28 | 59.9 | 49.9 |
| 85 | 29 | 39.7 | 32.6 |
| 86 | 30 | 48.5 | 41.6 |
| 87 | 31 | 52.9 | 47.2 |
| 88 | 32 | 58.3 | 50.8 |
| 89 | 33 | 56.4 | 47.5 |
| 90 | 34 | 49.2 | 39.3 |
| 91 | 35 | NT | NT |
| 92 | 36 | 48.6 | 44.5 |
| 93 | 37 | 57.3 | 51.7 |
| 94 | 38 | 46.0 | 39.7 |
| 95 | 39 | 35.7 | 35.5 |
| 96 | 40 | 17.0 | 14.3 |
| 97 | 41 | 55.3 | 45.0 |
| D | A | 34.1 | 37.0 |
| E | B | 31.5 | 33.8 |
| F | C | 23.9 | 19.4 |
| 98 | 42 | 57.2 | 50.8 |
| 99 | 43 | 54.3 | 48.2 |
| 100 | 44 | 56.4 | 50.4 |
| 101 | 45 | 52.1 | 49.6 |
| 102 | 46 | 37.3 | 30.2 |
| 103 | 47 | 32.5 | 32.8 |
| 104 | 48 | 39.5 | 35.1 |
| 105 | 49 | 38.7 | 35.3 |
| 106 | 50 | 38.4 | 32.5 |
| 107 | 51 | 42.8 | 38.3 |
| G | BNE | 34.1 | 34.72 |

Footnote to Table 8
NT = Not tested, dispersant not sufficiently soluble.
BNE = β naphthol-10-ethoxylate as disclosed in GB 2,060,715.

We claim:

1. A dispersant obtained by reacting polyethylene glycol, including a block copolymer of ethylene oxide (EO) and propylene oxide (PO), wherein the PO constitutes a middle portion attached at each end to EO units and where the amount of PO is less than 50% by weight relative to the total weight of the polymer, with a molar excess of hydroxycarboxylic acid containing from 4 to 17 carbon atoms or lactone thereof and/or with a $C_{3-4}$-alkylene oxide to form a polymeric diol and phosphating the diol to form a phosphate ester including its salt thereof with an alkali metal, ammonia, amine, alkanolamine or quaternary ammonium compound.

2. A dispersant as claimed in claim 1 wherein the phosphate ester is further partially esterified by reaction with an alcohol.

3. A dispersant as claimed in either claim 1 or claim 2 which is obtained from polyethylene glycol (PEG).

4. A dispersant as claimed in claim 1 wherein the polymeric diol is of formula (1)

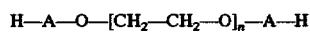  (1)

wherein
A is the group

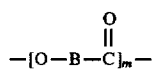

or the group —[O—D—]$_m$;
B is C$_{4-17}$-alkylene;
D is C$_{3-4}$-alkylene;
m is from 2 to 50; and
n is from 4 to 500.

5. A dispersant as claimed in claim 4 wherein the repeat unit

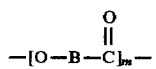

is derivable from ε-caprolactone.

6. A dispersant as claimed in claim 4 wherein the ratio of the molecular weight of —A— and molecular weight of the group [—CH$_2$CH$_2$—O]$_n$— is between 1.5:1 and 1:3.

7. A dispersant as claimed in claim 1 wherein the polyethylene glycol has a MW from 500 to 6000.

8. A dispersant as claimed in claim 5 wherein the ratio of the MWs of poly(5-hydroxy hexanoic acid) derived from ε-caprolactone and polyethylene glycol is from 1 to 1.

9. A process for making a dispersant as claimed in claim 1 which comprises reacting a polyethylene glycol with a molar excess of a hydroxycarboxylic acid containing from 4 to 17 carbon atoms or lactone thereof and/or with a C$_{3-4}$-alkylene oxide to form a polymeric diol and phosphating the diol to form a phosphate ester.

10. A process as claimed in claim 9 wherein the polyethylene glycol is reacted with the hydroxycarboxylic acid or lactone thereof in the presence of an alkyl titanate.

11. A composition comprising a dispersant as claimed in claim 1 and a particulate solid.

12. A composition as claimed in claim 11 wherein the solid is a pigment.

13. A composition as claimed in claim 11 which additionally comprises a liquid.

14. A composition as claimed in claim 13 wherein the liquid is water.

15. An aqueous paint comprising water-insoluble particulate solids and, as a dispersant therefor, a dispersant according to claim 1.

16. A dispersant which is a phosphate ester of a diol of formula (1)

$$H—A—O—[CH_2—CH_2—O]_n—A—H \qquad (1)$$

wherein
A is the group

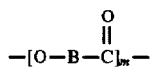

or the group —[O—D—]$_m$;
B is C$_{4-17}$-alkylene;
D is C$_{3-4}$-alkylene;
m is from 2 to 50; and
n is from 4 to 500.

17. A dispersant as claimed in claim 16 wherein the polymeric diol is of formula $$H—(O—D)_m—O—(CH_2CH_2O)_n—(O—D)_m—H$$

wherein
D is C$_{3-4}$-alkylene
m is from 6 to 30; and
n is from 10 to 100.

* * * * *